US011867268B2

(12) United States Patent
Mizuno

(10) Patent No.: US 11,867,268 B2
(45) Date of Patent: Jan. 9, 2024

(54) DRIVE TRANSMISSION MECHANISM, IMAGE FORMING APPARATUS INCLUDING DRIVE TRANSMISSION MECHANISM AND ASSEMBLY METHOD OF DRIVE TRANSMISSION MECHANISM

(71) Applicant: KYOCERA Document Solutions Inc., Osaka (JP)

(72) Inventor: Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 251 days.

(21) Appl. No.: 17/221,223

(22) Filed: Apr. 2, 2021

(65) Prior Publication Data
US 2021/0310549 A1 Oct. 7, 2021

(30) Foreign Application Priority Data

Apr. 3, 2020 (JP) ................................. 2020-067543

(51) Int. Cl.
*F16H 35/06* (2006.01)
*G03G 21/16* (2006.01)
*F16H 57/00* (2012.01)
*F16H 55/17* (2006.01)

(52) U.S. Cl.
CPC ............. *F16H 35/06* (2013.01); *F16H 55/17* (2013.01); *F16H 57/00* (2013.01); *G03G 21/1647* (2013.01)

(58) Field of Classification Search
CPC ............. G03G 15/757; G03G 15/1615; G03G 21/1857; G03G 21/1647; G03G 15/08; F16D 1/10; F16D 23/12
See application file for complete search history.

(56) References Cited

U.S. PATENT DOCUMENTS

| 9,690,253 B2 * | 6/2017 | Tamura | G03G 21/1647 |
| 9,836,011 B2 * | 12/2017 | Yamamoto | F16D 11/14 |
| 9,880,508 B2 * | 1/2018 | Tomita | G03G 15/757 |
| 10,126,702 B1 * | 11/2018 | Triplett | G03G 21/1647 |
| 10,175,629 B2 * | 1/2019 | Nieda | F16D 1/101 |
| 10,436,256 B2 * | 10/2019 | Kawamura | G03G 21/1647 |

(Continued)

FOREIGN PATENT DOCUMENTS

| JP | H03-272321 A | 12/1991 | | |
| JP | 2017048922 A | * | 3/2017 | ............. F16H 27/02 |
| JP | 2019159043 A | * | 9/2019 | ......... G03G 21/1853 |

*Primary Examiner* — Bobby Rushing, Jr.
(74) *Attorney, Agent, or Firm* — Studebaker & Brackett PC

(57) ABSTRACT

A drive transmission mechanism includes a drive input gear part, an output side coupling and a coil spring. The drive input gear part includes a cylindrical boss formed on a rotational center. The drive input gear part is coupled to a drive input side gear. The output side coupling is rotated together with the drive input gear part around a same rotational axis as the drive input gear part to output a drive force of the drive input gear part to a driven member. The coil spring biases the output side coupling to a direction separated away from the drive input gear part along the rotational axis. The drive input gear part and the output side coupling are rotatable around a slide pin inserted into a slide hole formed in the boss as the rotational axis. The coil spring is held between the output side coupling and the slide pin.

6 Claims, 12 Drawing Sheets

(56) References Cited

U.S. PATENT DOCUMENTS

| | | | | |
|---|---|---|---|---|
| 2013/0322924 | A1* | 12/2013 | Kondo | G03G 15/757 |
| | | | | 399/167 |
| 2018/0087604 | A1* | 3/2018 | Tamura | G03G 15/2053 |
| 2018/0180106 | A1* | 6/2018 | Hara | G03G 15/0868 |
| 2018/0203403 | A1* | 7/2018 | Ikeda | F16D 1/10 |

* cited by examiner ating claw 102*a* is engaged. The slit 103*a* is necessarily formed so

DRIVE TRANSMISSION MECHANISM, IMAGE FORMING APPARATUS INCLUDING DRIVE TRANSMISSION MECHANISM AND ASSEMBLY METHOD OF DRIVE TRANSMISSION MECHANISM

INCORPORATION BY REFERENCE

This application is based on and claims the benefit of priority from Japanese patent application No. 2020-067543 filed on Apr. 3, 2020, which is incorporated by reference in its entirety.

BACKGROUND

The present disclosure relates to a drive transmission mechanism capable of transmitting a rotating drive force, an image forming apparatus including the drive transmission mechanism and an assembly method of the drive transmission mechanism.

In an image forming apparatus, such as a copying machine, a printer and a facsimile, various rotating members are used in each unit, such as a drum unit, a development unit, a fixing unit and a conveyance unit. In order to transmit a rotating drive force to these rotating members, a drive transmission mechanism is well known, which includes a drive force transmission gear for transmitting a rotating drive force of a drive part and a coupling (a shaft coupling) for coupling a rotating shaft of the rotating member (a driven member) to a rotating shaft of the drive part.

In a conventional drive transmission mechanism, a spring is generally disposed between the drive force transmission gear and the coupling, and the coupling is biased in an axial direction by a restoration force of the spring. For example, a drive transmission mechanism is known, in which a coupling rotator connected to one end of a rotating drive shaft and biased in an axial direction by a spring and a rotating type stopper engaged with a flange portion of the coupling rotator at a position where the coupling rotator is separated away from a coupling receiver.

FIG. 10 is a perspective view showing an appearance of the conventional drive force transmission unit 101. FIG. 11 is a sectional perspective view showing the conventional drive force transmission unit 11 taken along a rotational axis. As shown in FIG. 10 and FIG. 11, the drive force transmission unit 101 includes a drive force input gear part 102, an output side coupling 103 fitted into an input side coupling (not shown), and a coil spring 105 disposed between the drive force input gear part 102 and the output side coupling 103. The coil spring 105 biases the output side coupling 103 in a direction protruding from the drive force input gear part 102 (the left direction in FIG. 11).

Around an outer circumferential face of the output side coupling 103, a slit 103*a* is formed. By engaging an engaging claw 102*a* provided in the drive force input gear part 102 with the slit 103*a*, it is configured such that the output side coupling 103 is not removed from the drive force input gear part 102 even if the output side coupling 103 is biased by the coil spring 105 in the direction protruding from the drive force input gear part 102.

FIG. 12 is a sectional side view showing a state where the conventional drive force transmission unit 101 is installed to a frame 110. As shown in FIG. 12, between the drive force transmission unit 101 and the frame 110, a coupling retracting mechanism 107 is disposed. By rotating the coupling retracting mechanism 107 to retract the output side coupling 103 to a side of the drive force input gear part 102 against the biasing force of the coil spring 105, it becomes possible to disengage the input side coupling from the output side coupling 103.

In the conventional drive transmission mechanism 101 shown in FIG. 10 to FIG. 12, the output side coupling 103 is configured to have the slit 103*a* with which the engaging claw 102*a* is engaged. The slit 103*a* is necessarily formed so as to have a length corresponding to a stroke (a moving area) of the output side coupling 103. Further, the drive input gear part 102 is formed with a cutting hole 102*b* serving as a mold cutting hole for forming the engaging claw 102*a*. Therefore, there is a problem that strength of the drive input gear part 102 and the output side coupling 103 decreases.

Further, when the drive force transmission unit 10 is installed to an apparatus main body 110, depending on a phase of the coupling retreating mechanism 107, as shown in FIG. 12, the drive transmission mechanism 102 may be pushed back in a thrust direction by the biasing force of the coil spring 105. As a result, the drive force input gear part 102 may be disengaged from gears 109*a* and 109*b* disposed adjacent to the drive transmission mechanism 101, and an assembling performance may be deteriorated.

SUMMARY

In accordance with one aspect of the present disclosure, a drive transmission mechanism includes a drive input gear part, an output side coupling and a coil spring. The drive input gear part includes: a cylindrical boss formed on a rotational center; a rim formed concentrically with the boss on an outer side in a radial direction of the boss, and around which gear teeth are formed; and a web coupling between the boss and the rim. The drive input gear part is coupled to a drive input side gear. The output side coupling is rotated together with the drive input gear part around a same rotational axis as the drive input gear part to output a drive force of the drive input gear part to a driven member. The coil spring biases the output side coupling to a direction separated away from the drive input gear part along the rotational axis. The drive input gear part and the output side coupling are rotatable around a slide pin inserted into a slide hole formed in the boss as the rotational axis. The coil spring is held between the output side coupling and the slide pin.

In accordance with one aspect of the present disclosure, an image forming apparatus includes the drive transmission mechanism.

In accordance with one aspect of the present disclosure, an assembling method of a drive transmission mechanism, wherein the drive transmission mechanism includes a drive input gear part, an output side coupling, a coil spring, a slide pin and a coupling retracting mechanism, wherein the drive input gear part includes: a cylindrical boss formed on a rotational center; a rim formed concentrically with the boss on an outer side in a radial direction of the boss, and around which gear teeth are formed; and a web coupling between the boss and the rim, the drive input gear part is coupled to a drive side input gear, the output side coupling is rotated together with the drive input gear part around a same rotational axis as the drive input gear part to output a drive force of the drive input gear part to a driven member, the coil spring biases the output side coupling to a direction separated away from the drive input gear part along the rotational axis, the slide pin is inserted into a slide hole formed in the boss, and the coupling retracting mechanism retracts the output side coupling in a direction approaching the drive input gear part against biasing force of the coil spring. The assembling method includes: a first step to fit the coupling retracting mechanism in a guide hole formed in a frame placed horizontally; a second step to dispose the drive input gear part and the output side coupling from above the coupling retracting mechanism with their rotating centers coincident with the rotational center; a third step to insert the coil spring into the slide hole of the drive input gear part; and a fourth step to insert the slide pin fixed on a drive sheet metal in the slide hole and to fix the drive sheet metal to the frame.

The objects, features, and advantages of the present disclosure will become more apparent from the following description. In the detailed description, reference is made to the accompanying drawings, and preferred embodiments of the present disclosure are shown by way of example in the accompanying drawings.

BRIEF DESCRIPTION OF THE DRAWINGS

FIG. 4 is a disassembled perspective view showing the drive part 30 including the drive transmission unit 40 of the embodiment and its periphery, when viewed from an inside of a frame 100a.

DETAILED DESCRIPTION

Figure 1:
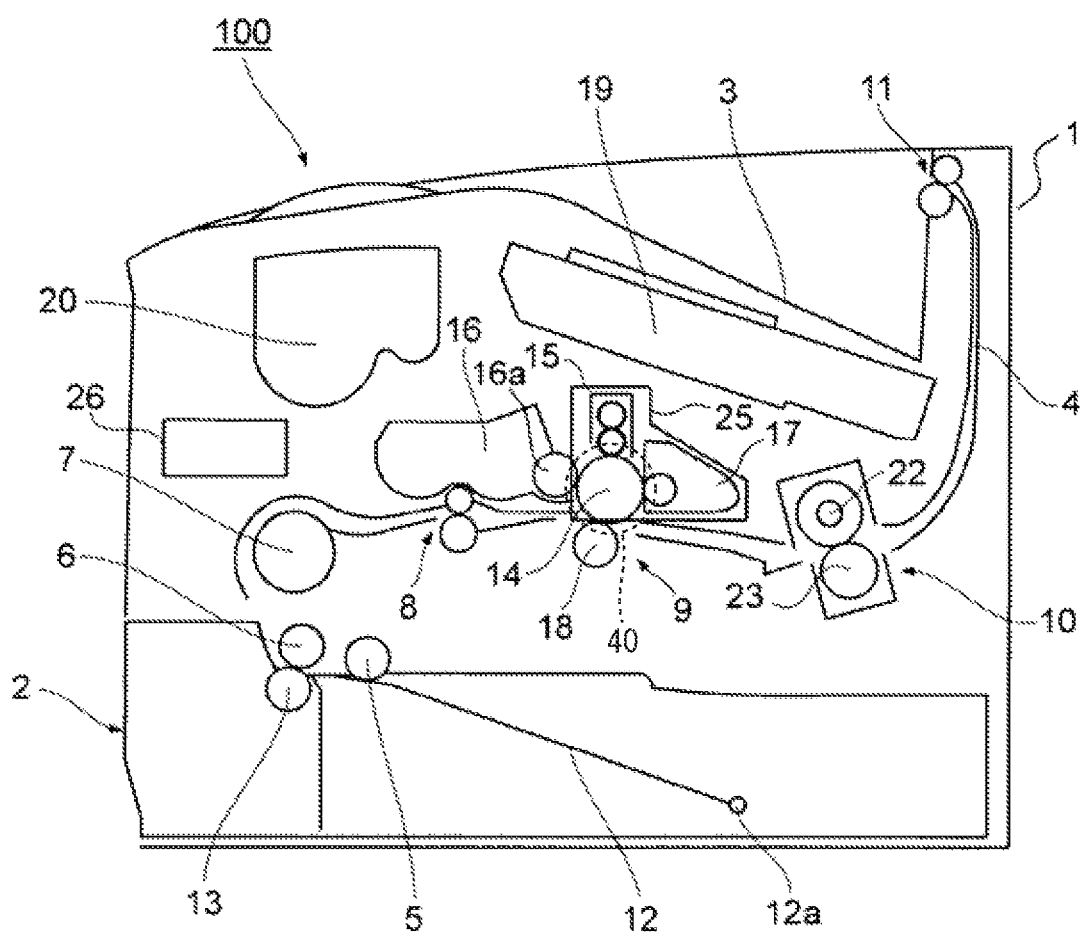
FIG. 1 is a sectional view showing a structure of an image forming apparatus 100 including a drive transmission unit 40 according to one embodiment of the present disclosure.

Hereinafter, with reference to the attached drawings, one embodiment in the present disclosure will be described. FIG. 1 is a sectional view schematically showing an inner structure of an image forming apparatus 100 including a drive transmission unit 40 according to the embodiment of the present disclosure. In FIG. 1, the left side indicates the front side of the image forming apparatus 100. As shown in FIG. 1, the image forming apparatus 100 (a monochrome printer) includes a sheet feeding cassette 2 in which stacked sheets (recording mediums) are stored, in a lower portion of an apparatus main body 1. Above the sheet feeding cassette 2, a sheet conveyance path 4 is formed so as to extend rearward in almost a horizontal direction from the front side to the rear side of the apparatus main body 1 and further extend upward to reach a sheet discharge part 3 formed on an upper surface of the apparatus main body 1. Along the sheet conveyance path 4, a pickup roller 5, a feed roller 6, an intermediate conveyance roller 7, a resist rollers pair 8, an image forming part 9, a fixing unit 10 and a discharge rollers pair 11 are disposed in this order from an upstream side. Further, in the image forming apparatus 100, a control unit 26 which controls operations of the above rollers, the image forming unit 9, the fixing unit 10 and the others is disposed.

The sheet feeding cassette 2 includes a sheet placement plate 12 supported in a turnable manner with respect to the sheet feeding cassette 2 around a rotational fulcrum 12a provided in an upstream end portion in a sheet conveyance direction. When the sheet placement plate 12 is turned upward, the sheet stacked on the sheet placement plate 12 is pressed on the pickup roller 5. On a front side of the sheet feeding cassette 2, a retard roller 13 pressed on the feed roller 6 is disposed. In a case where plural numbers of the sheets are fed at the same time by the pickup roller 5, the sheets are separated one by one by the feed roller 6 and the retard roller 13, and only the uppermost sheet is conveyed.

The sheet separated by the feed roller 6 and the retard roller 13 is changed in the conveyance direction to the rear side of the apparatus main body, conveyed to the resist rollers pair 8, and then conveyed to the image forming part 9 after a conveyance timing is adjusted by the resist rollers pair 8.

The image forming part 9 forms a predetermined toner image on the sheet in an electrophotographic process. The image forming part 9 includes a photosensitive drum 14 as an image carrier supported so as to be rotatable in the counterclockwise direction in FIG. 1, a charging device 15, a development unit 16 and a cleaning device 17 which are disposed around the photosensitive drum 14, a transferring roller (a transferring member) 18 disposed so as to face the photosensitive drum 14 across the sheet conveyance path 4, an exposure unit (LSU) 19 disposed above the photosensitive drum 14 and an erasing device (not shown). Above the development unit 16, a toner container 20 which replenishes a toner to the development unit 16 is disposed. The photosensitive drum 14, the charging device 15 and the cleaning device 17 are integrated into a unit, and forms a drum unit 25.

The charging device 15 includes a charging roller coming into contact with the photosensitive drum 14. When the photosensitive drum 14 is rotated, the charging roller is driven to be rotated while coming into contact with the photosensitive drum 14. At this time, by applying a predetermined voltage on the charging roller, a surface of the photosensitive drum 14 is charged uniformly.

Next, based on input image data, an electrostatic latent image is formed on the surface of the photosensitive drum by laser beam emitted from the exposure unit (LSU) 19. To the formed electrostatic latent image, the toner carried on a development roller 16a of the development unit 16 is adhered to form a toner image on the surface of the photosensitive drum 14. The toner image formed on the surface of the photosensitive drum 14 is transferred to the sheet fed from the resist rollers pair 8 to a nip area between the photosensitive drum 14 and the transferring roller 18.

The sheet on which the toner image is transferred is separated from the photosensitive drum 14 and then conveyed toward the fixing unit 10. The fixing unit 10 is disposed on a downstream side of the image forming part 9 in the sheet conveyance direction. The sheet on which the toner image is transferred in the image forming part 9 is heated and pressed by a heating roller 22 and a pressure roller 23 pressed on the heating roller 22 included in the fixing unit 10, and then the toner image transferred on the sheet is fixed to the sheet. After the image forming process and the fixing process are performed in the image forming part 9 and the fixing unit 10, the sheet is discharged by the discharge rollers pair 11 to the sheet discharge part 3.

On the other hand, the toner remaining on the surface of the photosensitive drum 14 after the transferring is removed by a cleaning roller and a cleaning blade (both are not shown) in the cleaning device 17. Charge remaining on the surface of the photosensitive drum 14 is removed by the erasing device. After that, the photosensitive drum 14 is charged by the charging device 15 again, and then the image forming process is performed in the above manner.

Figure 2:
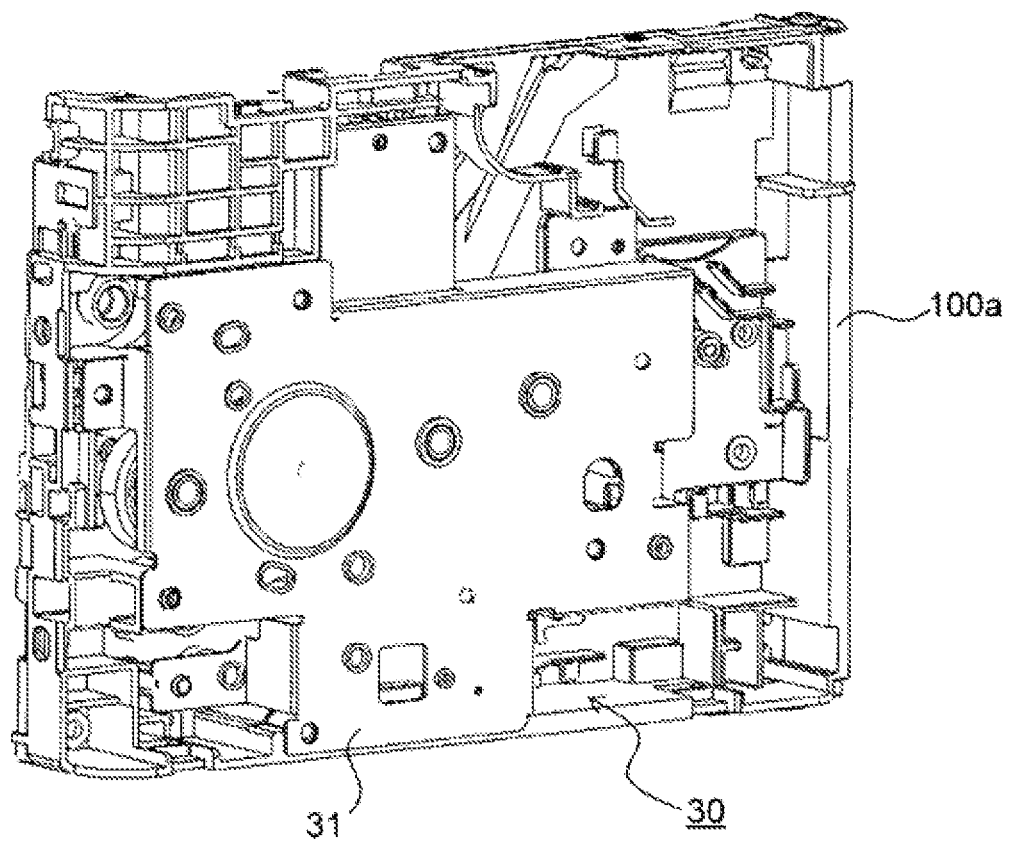
FIG. 2 is a perspective view showing a drive part 30 of a development unit 16 and a drum unit 25, including the drive transmission unit 40 in the embodiment and its periphery, viewed from an outside of a drive sheet metal 31.
Figure 3:
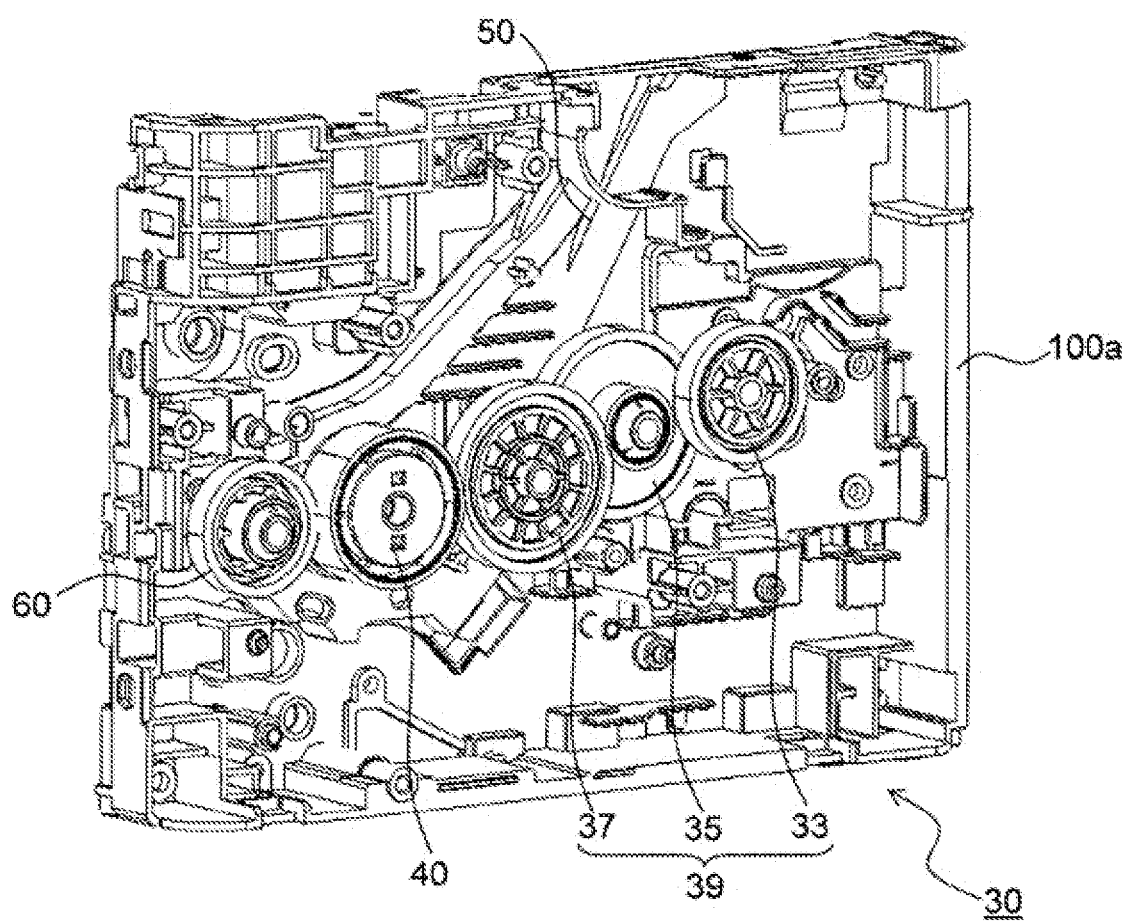
FIG. 3 is a perspective view showing the drive part 30 and its periphery in a state where the drive sheet metal 31 is detached from a state shown in FIG. 2.
Figure 4:
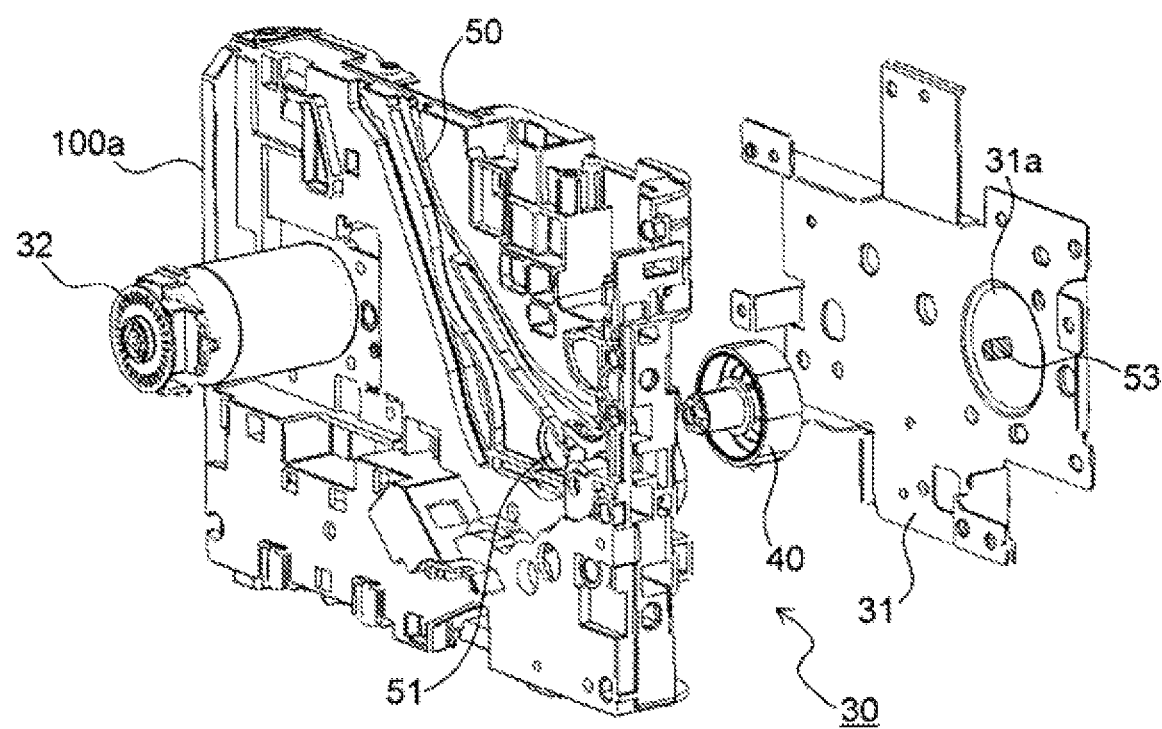

FIG. 2 is a perspective view showing a drive part 30 of the development unit 16 and the drum unit 25 and its periphery when viewed from an outside of a drive sheet metal 31. FIG. 3 is a perspective view showing the drive part 30 and its periphery in which the drive sheet metal 31 is removed from the state shown in FIG. 2. FIG. 4 is a disassembled perspective view showing the drive part 30 including the drive transmission unit 40 and its periphery when viewed from an inside of a frame 100a. As shown in FIG. 2 to FIG. 4, on one side of an inside of the apparatus main body 1 (a rear side with respect to a paper face on which FIG. 1 is drawn), the frame 100a to which a plurality of gears is attached in a rotatable manner is disposed.

On the frame 100a, a drive motor 32, a drive transmission gear train 39 and the drive transmission unit 40 which transmit a rotating drive force of the drive motor 32 to the development unit 16 (refer to FIG. 1), and a gear 60 which transmits the rotating drive force of the drive motor 32 to the drum unit 25 (refer to FIG. 1) via the drive transmission unit 40. The drive transmission gear train 39 includes gears 33, 35 and 37.

On an inner side face of the frame 100a, a guide rail 50 is formed so as to guide the development unit 16 and the drum unit 25 to attachment positions. In a lower end portion of the guide rail 50, a guide hole 51 is formed, through which an output side coupling 43 of the drive transmission unit 40 is passed. When the development unit 16 is inserted to the attachment position along the guide rail 50, an input side coupling (not shown) of the development unit 16 is engaged with the output side coupling 43 to allow a transmission of the drive force to the development unit 16.

On a rear side face of the drive sheet metal 31, a circular recess 31a is formed. The recess 31a faces a drive input gear part 41 (refer to FIG. 5) of the drive transmission unit 40. On a center of the recess 31a, a slide pin 53 is fixed. The slide pin 53 is fitted into a slide hole 41e (refer to FIG. 8) of the drive input gear part 41.

Figure 5:
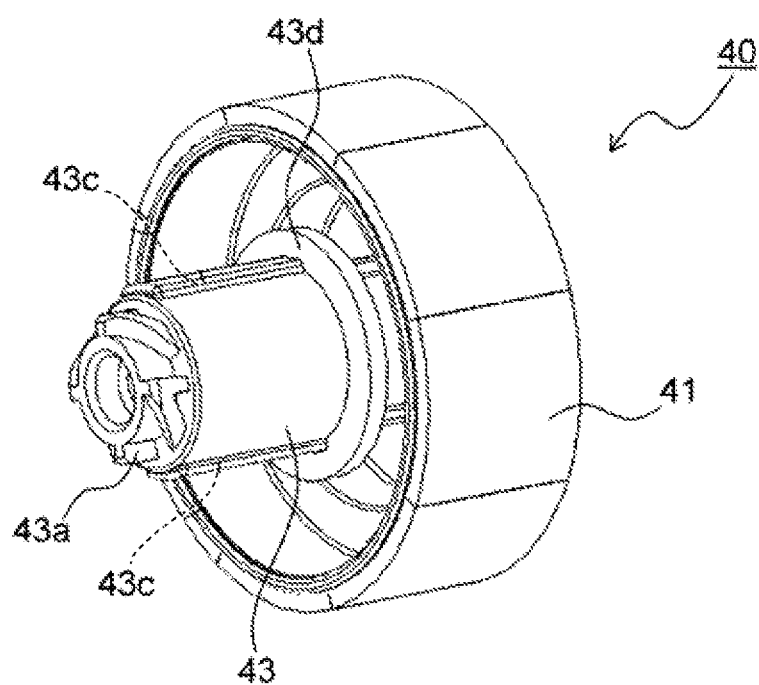
FIG. 5 is a perspective view showing an appearance of the drive transmission unit 40 of the embodiment.
Figure 6:
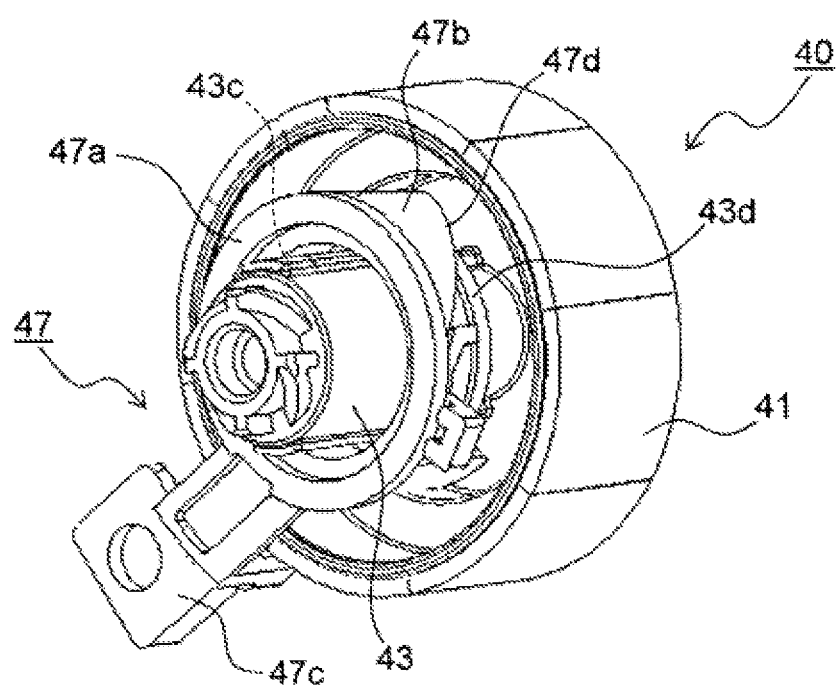
FIG. 6 is a perspective view showing a state where a coupling retreating mechanism 47 is attached to the drive transmission unit 40 shown in FIG. 5.
Figure 7:
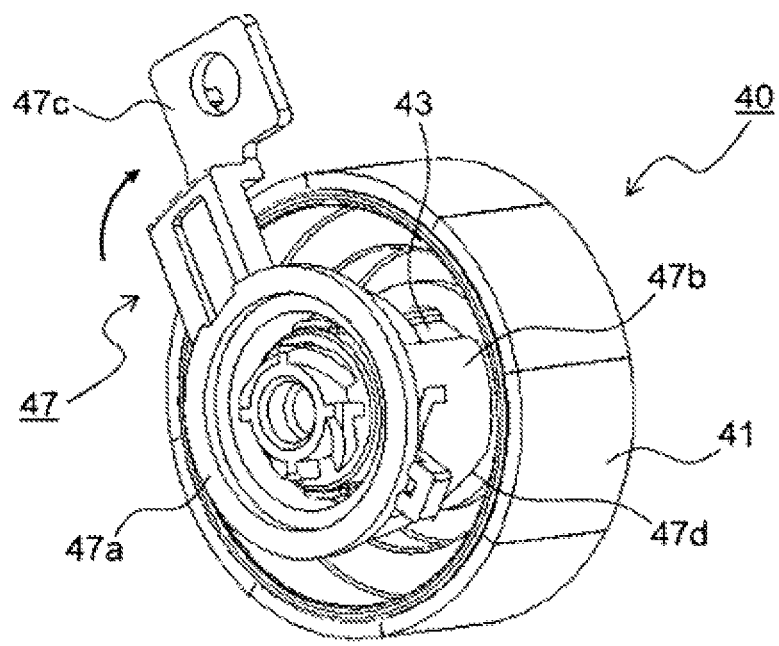
FIG. 7 is a perspective view showing a state where the coupling retreating mechanism 47 is rotated from the state shown in FIG. 6 to retreat an output side coupling 43.
Figure 8:
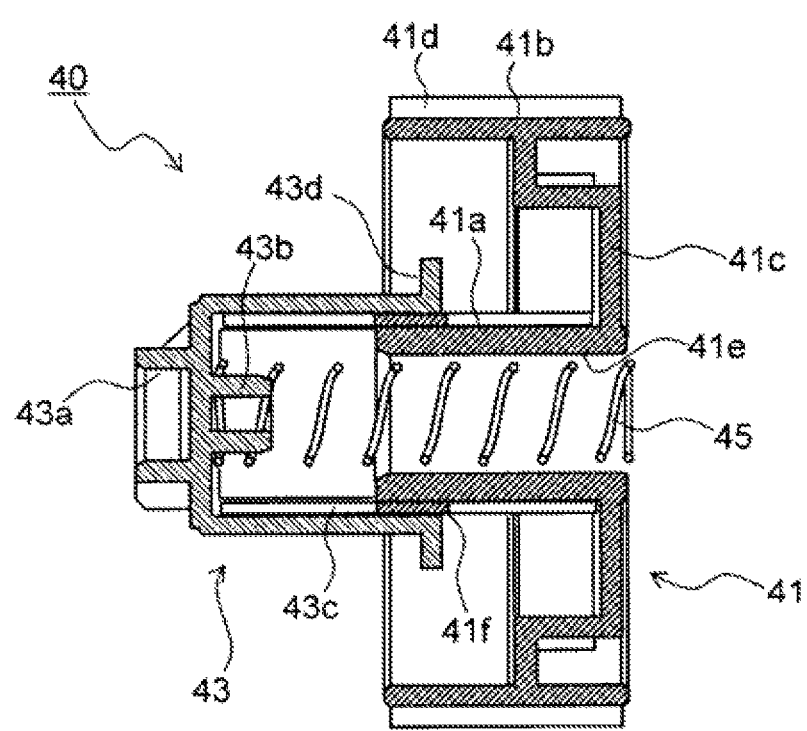
FIG. 8 is a sectional side view showing the drive transmission unit 40 taken along a rotational axis.

FIG. 5 is a perspective view showing an appearance of the drive transmission unit 40 in the present embodiment. FIG. 6 and FIG. 7 are perspective views showing a state where a coupling retreating mechanism 47 is attached to the drive transmission unit 40 shown in FIG. 5. FIG. 8 is a sectional side view showing the drive transmission unit 40 in the present embodiment taken along a rotational axis. The drive transmission unit 40 includes the drive input gear part 41, the output side coupling 43 and a coil spring 45. The drive input gear part 41 and the output side coupling 43 are formed by injection molding of resin such as POM (polyacetal).

The drive input gear part 41 has a cylindrical boss 41a formed on a center portion thereof, a rim 41b disposed concentrically with the boss 41a on an outer side in a radial direction of the boss 41a, and a web 41c coupling between the boss 41a and rim 41b. Around an outer circumferential face of the rim 41b, gear teeth 41d meshed with the gear 37 and the gear 60 are formed.

Inside the boss 41a, a slide hole 41e into which the slide pin 53 (refer to FIG. 9) caulked to the drive sheet metal 31 is inserted. At two positions opposite to each other on an outer circumferential face of the boss 41a, protrusions 41f are formed.

The output side coupling 43 has a cylindrical shape whose tip end portion is closed, and on an outer circumferential face of the tip end portion of the output side coupling 43, an engaging claw 43a engaged with the input side coupling of the drum unit 25 is formed. On an inner circumferential face of the tip end portion of the output side coupling 43, a positioning projection 43b to position the coil spring 45 (to center) is formed.

At two positions opposite to each other on the inner circumferential face of the output side coupling 43, engaging grooves 43c are formed so as to extend in the axial direction. When the output side coupling 43 is inserted into the boss 41a of the drive input gear part 41, the protrusions 41f are engaged with the engaging grooves 43c. Thus, when a rotating drive force is input to the drive input gear part 41, the output side coupling 43 is rotated together with the drive input gear part 41 around the same rotational axis as the drive input gear part 41.

Inside the output side coupling 43, the coil spring 45 is disposed. FIG. 8 shows the coil spring 45 in a state where a load is not applied to the coil spring 45. In the state, the coil spring 45 extends from the inner face of the tip end portion of the output side coupling 43 to an opening edge of the slide hole 41e (almost the same plane as the web 41c) through the slide hole 41e of the drive input gear part 41.

The coupling retracting mechanism 47 includes an annular part 47a, a pressing part 47b, and a lever 47c. The annular part 47a is fitted into the guide hole 51 (refer to FIG. 4) of the frame 100a in a rotatable manner. The pressing part 47b is protruded from the annular part 47a toward the drive input gear part 41 along the rotational axis. The lever 47c is protruded from the annular part 47a on an outer side in a radial direction. The pressing part 47b has an inclined face 47d whose protruding amount in the axial direction is gradually varied.

FIG. 6 shows a state where the output side coupling 43 is protruded from the drive input gear part 41. When the lever 47c is held and rotates the coupling retracting mechanism 47 in the clockwise direction from the state shown in FIG. 6, as shown in FIG. 7, the pressing part 47b runs on the flange part 43d of the output side coupling 43 along the inclined face 47d. Then, the output side coupling 43 is pushed by the pressing part 47b and retracted in a direction approaching the drive input gear part 41 against a biasing force of the coil spring 45. As a result, the output side coupling 43 is disengaged from the input side coupling of the development unit 16, and the development unit 16 is allowed to be detached along the guide rail 50.

An assembling method of the drive part 30 including the drive transmission unit 40 in the present embodiment will be described. First, the frame 100a is placed horizontally with the outer side face (the front side face of the paper surface on which FIG. 3 is drawn) upward, and the gears 33, 35, 37 and 60 are attached to the predetermined positions. Next, into the guide hole 51 of the frame 100a, the coupling retracting mechanism 47 is fitted (a first step). Then, the drive input gear part 41 and the output side coupling 43 are disposed from above the coupling retracting mechanism 47 with their rotating centers coincident (a second step).

Next, the coil spring 45 is inserted into the slide hole 41e of the drive input gear part 41 (a third step). Finally, the slide pin 53 fixed to the drive sheet metal 31 is positioned with respect to the slide hole 41e and then inserted into the slide hole 41e (a fourth step), and, as shown in FIG. 2, the drive sheet metal 31 is fastened to the frame 100a with a screw. Then, the assembling of the drive part 30 is completed.

Figure 9:
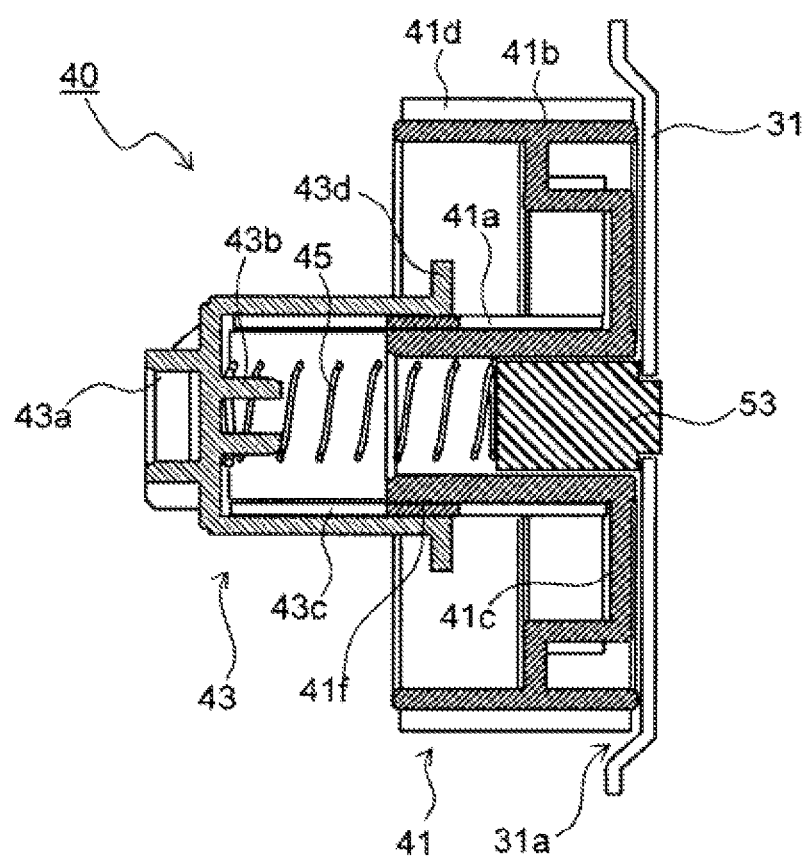
FIG. 9 is a sectional side view showing the drive transmission unit 40 of the embodiment, to which the drive sheet metal 31 is attached.

FIG. 9 is a view showing a state where the drive sheet metal 31 is attached to the drive input gear part 41 of the drive transmission unit 40 shown in FIG. 8. As shown in FIG. 9, the slide pin 53 is caulked to the center portion of the recess 31a of the drive sheet metal 31. By inserting the slide pin 53 into the slide hole 41e of the boss 41a, the drive input gear part 41 is supported by the slide pin 53 in a rotatable manner.

By the insertion of the slide pin 53 into the slide hole 41e, the coil spring 45 disposed in the output side coupling 43 and the boss 41a is compressed, and the coil spring 45 is held between the inner face of the tip end portion of the output side coupling 43 and the tip end of the slide pin 53. As a result, the output side coupling 43 is biased in a direction separated away from the drive input gear part 41 (the left direction in FIG. 9).

When the drive motor 32 is started to be driven and rotated, a rotating drive force is transmitted to the rim 41b of the drive input gear part 41 through the gears 33, 35 and 37. Then, the rotation drive force is transmitted from the drive input gear part 41 to the output side coupling 43, and then transmitted to the development roller 16a and the agitating and conveyance screw (not shown) in the development unit 16 through the input side coupling fitted into the output side coupling 43.

According to the configuration in the present embodiment, the coil spring 45 is pressed by the slide pin 53 fixed to the drive sheet metal 31 and biases the output side coupling 43 in an engaging direction. Therefore, the biasing force of the coil spring 45 is not acted on the output side coupling 43 before the drive sheet metal 31 is attached.

Figure 10:
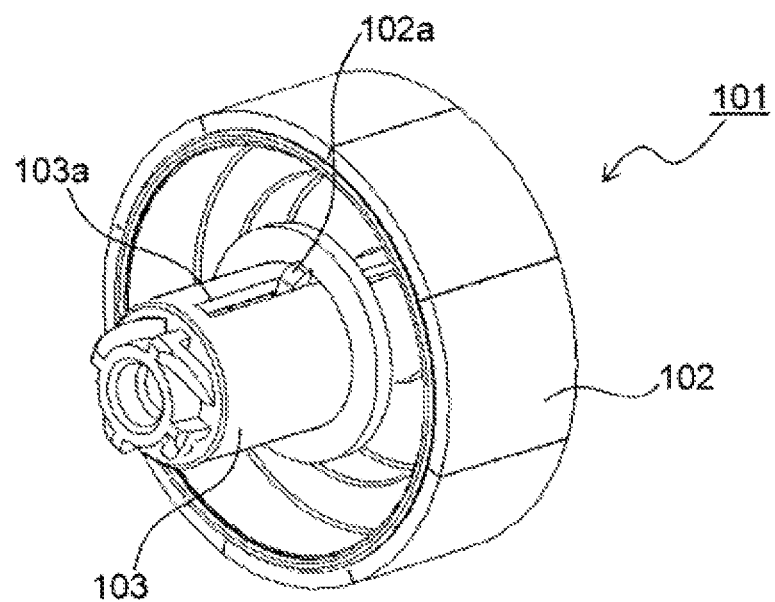
FIG. 10 is a perspective view showing an appearance of a conventional drive transmission unit 101.
Figure 11:
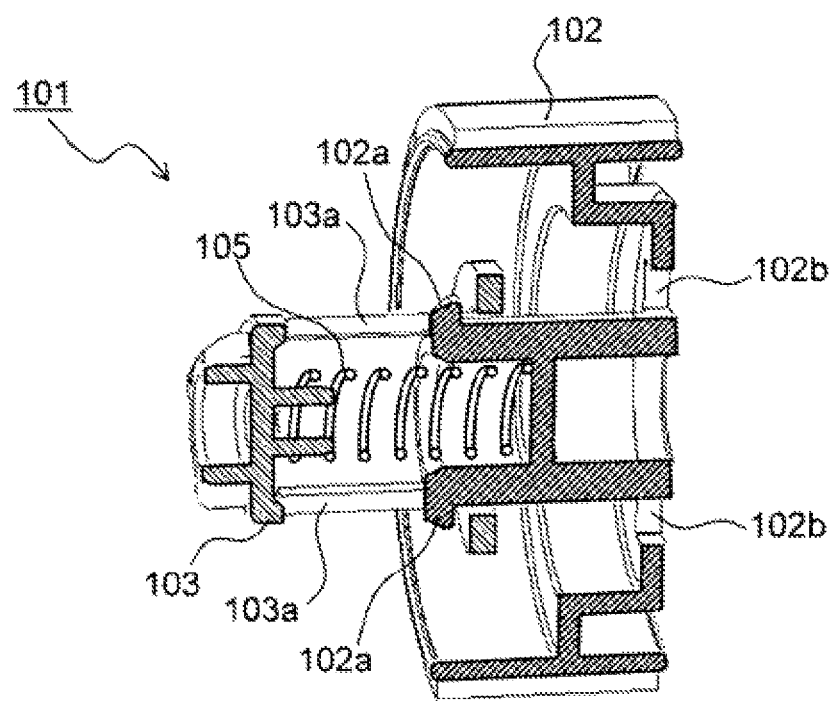
FIG. 11 is a sectional perspective view showing the conventional drive transmission unit 101 taken along a rotational axis.
Figure 12:
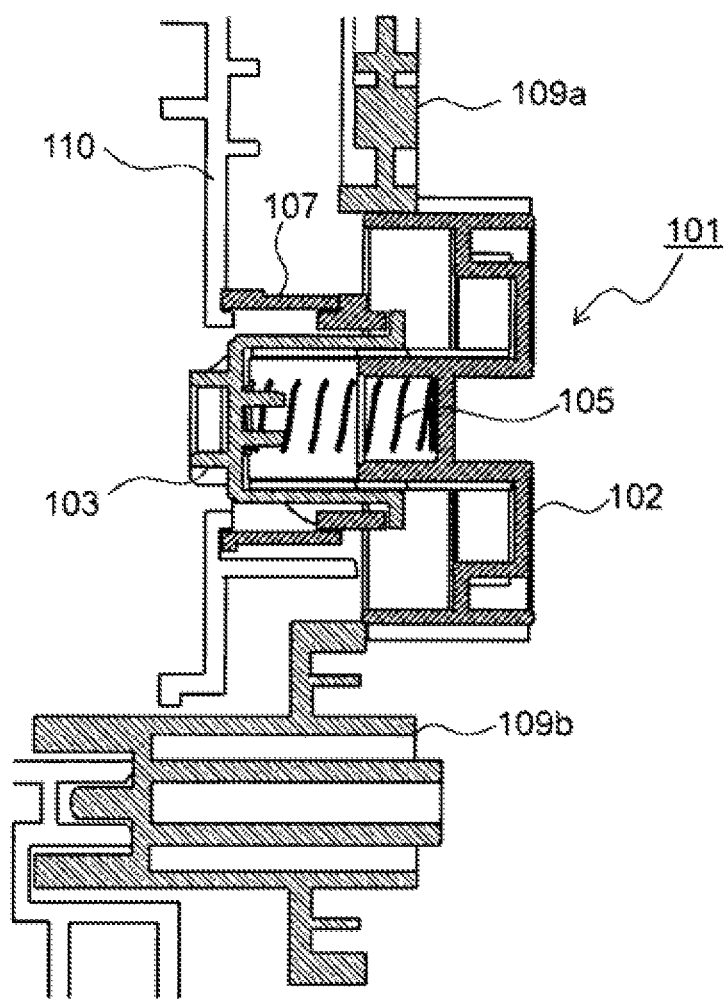
FIG. 12 is a sectional side view showing a state where the conventional drive transmission unit 101 is installed to a frame 110.

Then, the need for a mechanism for preventing the removal of the output side coupling 43 is eliminated, and therefore, unlike the conventional drive transmission unit shown in FIG. 10 to FIG. 12 in which the coil spring 105 is disposed between the drive input gear part 102 and the output side coupling 101, it is not necessary to form the locking claw 102a and the cutting hole 102b of the drive input gear part 102, and the slit 103a of the output side coupling 103. Therefore, it is possible to suppress the deterioration of the strength of the components constituting the drive transmission unit 40.

Further, at a time of the assembling of the drive part 30, the position of the drive input gear part 41 in the thrust direction becomes an appropriate position to be engaged with the adjacent gears 37 and 60 regardless of the phase of the coupling retreating mechanism 47. Therefore, the attachment performance of the drive sheet metal 31 can be maintained.

In addition, the present disclosure is not limited to the above embodiments, and various modifications can be made without departing from the scope of the present disclosure. For example, the above embodiment shows an example that present disclosure is applied to the drive transmission unit 40 which transmits a rotating drive force to the development roller 16a and the agitating and conveyance roller (not shown) in the development unit 16, but the present disclosure is not limited thereto, and the present disclosure may be applied to a drive transmission mechanism which transmits the rotating drive force to another unit, such as the drum unit 25.

The present disclosure is not limited to the monochrome printer as shown in FIG. 1, but is applicable to various image forming apparatuses, such as monochrome and color copying machines, a digital multifunction peripheral, a color printer, and a facsimile.

The present disclosure is applicable to a drive transmission mechanism which transmits a drive force to a rotated member by using a drive input gear part and an output side coupling. Application of the present disclosure makes it possible to provide a drive transmission mechanism excellent in assembling workability while securing strength of the drive input gear part and the output side coupling, and to provide an image forming apparatus including the drive transmission mechanism.

The invention claimed is:

1. A drive transmission mechanism comprising a drive input gear part, an output side coupling, a coil spring, a coupling retracting mechanism and a slide pin, wherein
   the drive input gear part includes:
   a cylindrical boss formed on a rotational center;
   a slide hole formed so as to penetrate the boss;
   a protrusion formed on an outer circumferential surface of the boss;
   a rim formed concentrically with the boss on an outer side in a radial direction of the boss, and around which gear teeth are formed; and
   a web coupling between the boss and the rim,
   the drive input gear part being coupled to a drive input side gear,
   the output side coupling is formed into a cylindrical shape, has an engagement groove which is formed on an inner circumferential surface and is engageable with the protrusion, has an annular flange part protruding outward formed around an outer circumferential surface of an axial end portion, inserted on an outer circumference of the boss, and rotated together with the drive input gear part around a same rotational axis as the drive input gear part to output a drive force of the drive input gear part to a driven member,
   the coil spring biases the output side coupling to a direction separate from the drive input gear part along the rotational axis,
   the coupling retracting mechanism retracts the output side coupling inserted on the outer circumference of the boss from a position separate from the web of the drive input gear part closer to the web against biasing force of the coil spring, and
   the slide pin is inserted into the slide hole and supports the drive input gear part rotatable as the rotational axis, wherein
   when the drive input gear part is disposed at a position where the drive input gear part is capable of being meshed with a gear disposed adjacent to the drive input gear part, the output side coupling is kept at a position separate from the web by the coupling retracting mechanism, and the coil spring is not protruded through an opening edge of the slide hole in a state where the coil spring is not applied with a load, and
   when the slide pin is inserted into the slide hole, the coil spring is held between the output side coupling and the slide pin.

2. The drive transmission mechanism according to claim 1, wherein the slide pin is fixed to a drive sheet metal disposed on an opposite side to the output side coupling with respect to the drive input gear part.

3. An image forming apparatus comprising the drive transmission mechanism according to claim 1.

4. The drive transmission mechanism according to claim 1, wherein,
when the output side coupling is retracted by the output side coupling retracting mechanism, a part of the output side coupling and a part of the coupling retracting mechanism are stored in a space between the boss and the rim of the drive input gear part.

5. The drive transmission mechanism according to claim 1, wherein
a circular recess is formed on a surface of a drive sheet metal opposite to the drive input gear part, and
the slide pin is fixed at a center of the recess.

6. An assembling method of a drive transmission mechanism,
wherein the drive transmission mechanism includes a drive input gear part, an output side coupling, a coil spring, a slide pin and a coupling retracting mechanism, wherein
the drive input gear part includes:
a cylindrical boss formed on a rotational center;
a slide hole formed so as to penetrate the boss;
a protrusion formed on an outer circumferential surface of the boss;
a rim formed concentrically with the boss on an outer side in a radial direction of the boss, and around which gear teeth are formed; and
a web coupling between the boss and the rim,
the drive input gear part is coupled to a drive side input gear,
the output side coupling is formed into a cylindrical shape, has an engagement groove which is formed on an inner circumferential surface and is engageable with the protrusion, has an annular flange part protruding outward formed around an outer circumferential surface of an axial end portion, inserted on an outer circumference of the boss, and rotated together with the drive input gear part around a same rotational axis as the drive input gear part to output a drive force of the drive input gear part to a driven member,
the coil spring biases the output side coupling to a direction separate from the drive input gear part along the rotational axis,
the slide pin is inserted into the slide hole, and
the coupling retracting mechanism retracts the output side coupling in a direction approaching the drive input gear part against biasing force of the coil spring, the assembling method comprising:
a first step to fit the coupling retracting mechanism in a guide hole formed in a frame placed horizontally;
a second step to dispose the drive input gear part and the output side coupling from above the coupling retracting mechanism with their rotating centers coincident with the rotational center and then to dispose the drive input gear at a position where the drive input gear part is capable of being meshed with a gear disposed adjacent to the drive input gear part;
a third step to insert the coil spring into the slide hole of the drive input gear part; and
a fourth step to insert the slide pin fixed on a drive sheet metal in the slide hole and to fix the drive sheet metal to the frame.

\* \* \* \* \*